Figure 1:
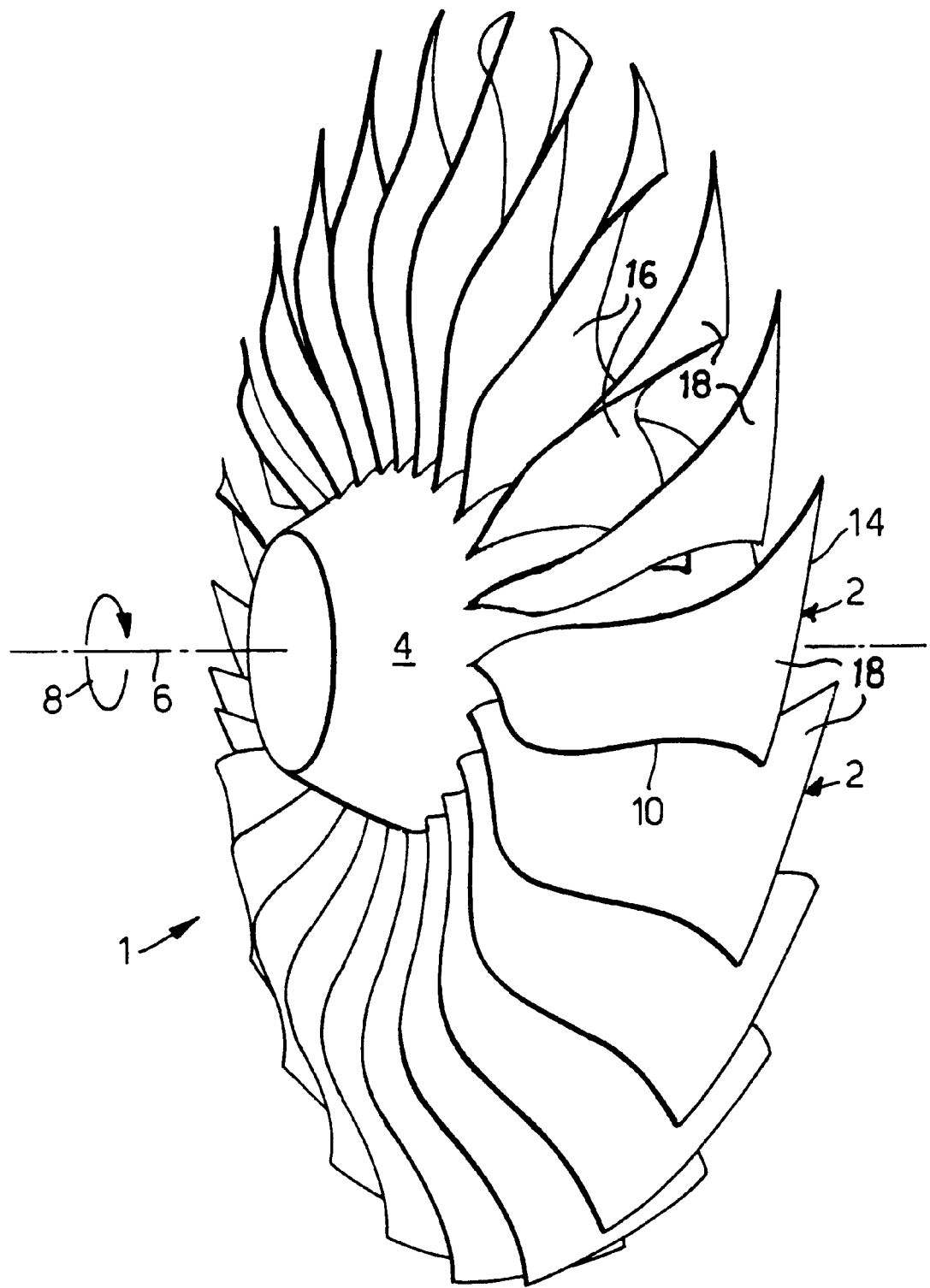

United States Patent [19]
Rowlands

[11] Patent Number: 6,071,077
[45] Date of Patent: Jun. 6, 2000

[54] SWEPT FAN BLADE

[75] Inventor: Paul A. Rowlands, Bristol, United Kingdom

[73] Assignee: Rolls-Royce PLC, London, United Kingdom

[21] Appl. No.: 09/168,968

[22] Filed: Oct. 9, 1998

Related U.S. Application Data

[63] Continuation-in-part of application No. 08/819,269, Mar. 18, 1997, abandoned.

[30] Foreign Application Priority Data

Apr. 9, 1996 [GB] United Kingdom ............... 9607316

[51] Int. Cl.[7] ........................................... F04D 29/34
[52] U.S. Cl. .......................... 416/223 A; 416/DIG. 2; 416/DIG. 5
[58] Field of Search ................... 416/223 A, DIG. 5, 416/DIG. 2

[56] References Cited

U.S. PATENT DOCUMENTS

| | | |
|---|---|---|
| 3,989,406 | 11/1976 | Bliss . |
| 4,358,246 | 11/1982 | Hanson et al. . |
| 4,488,399 | 12/1984 | Robey et al. . |
| 4,726,737 | 2/1988 | Weingold et al. . |
| 4,790,724 | 12/1988 | Bousquet et al. . |
| 5,064,345 | 11/1991 | Kimball . |
| 5,249,922 | 10/1993 | Sato et al. . |
| 5,642,985 | 7/1997 | Spear et al. . |

FOREIGN PATENT DOCUMENTS

| | | |
|---|---|---|
| 0265335 | 4/1988 | European Pat. Off. . |
| 0 266 298 | 5/1988 | European Pat. Off. . |
| 0 385 913 | 9/1990 | European Pat. Off. . |
| 2-104-975 | 3/1983 | United Kingdom . |
| 2-170-868 | 8/1986 | United Kingdom . |
| 2-197-913 | 6/1988 | United Kingdom . |
| WO 81/00243 | 2/1981 | WIPO . |

*Primary Examiner*—John Kwon
*Attorney, Agent, or Firm*—Oliff & Berridge, PLC

[57] ABSTRACT

A swept fan blade design for the low pressure compressor rotor or fan rotor stage of a ducted fan gas turbine engine has a leading edge swept forward near the hub up to a first radial height, then rearward up to second radial height and finally is swept forward again up to the blade tip. The aerodynamic effect is to produce a mid-height bias to the airflow enabling the tip region to be given increased twist and to possess increased resistance to foreign object damage. The design also provides a rear radial blade stacking axis to help reduce internal stresses due to centrifugal forces.

13 Claims, 7 Drawing Sheets

Fig.8.

| PLANE SECTION NUMBER (n) | SUCTION SURFACE MINIMUM STATIC PRESSURE POINT | | | LEADING EDGE | | |
|---|---|---|---|---|---|---|
| | SWEEP ANGLE (PS) | MACH ANGLE | MACH N° | SWEEP ANGLE (LS) | MACH ANGLE | MACH N° |
| 1→2 | 0 | 66·6 | 1·09 | −26·9 | — | <1 |
| 2→3 | −11·7 | 53·8 | 1·24 | −25·4 | — | <1 |
| 3→4 | 4·8 | 50·3 | 1·30 | −21·6 | 74·1 | 1·04 |
| 4→5 | 15·1 | 47·8 | 1·35 | 1·4 | 62·2 | 1·13 |
| 5→6 | 26·9 | 46·9 | 1·37 | 6·4 | 57·2 | 1·19 |
| 6→7 | 34·9 | 46·0 | 1·39 | 19·1 | 53·8 | 1·24 |
| 7→8 | 34·9 | 44·4 | 1·43 | 25·5 | 49·0 | 1·31 |
| 8→9 | 25·4 | 43·2 | 1·46 | 23·2 | 46·9 | 1·37 |
| 9→10 | 26·9 | 42·5 | 1·48 | 10·9 | 44·4 | 1·43 |
| 10→11 | 27·6 | 41·1 | 1·52 | −5·5 | 42·2 | 1·49 |

SWEPT FAN BLADE

This is a Continuation-in-Part of application Ser. No. 08/819,269 filed Mar. 18, 1997 now abandoned. The entire disclosure of the prior application is hereby incorporated by reference herein in its entirety.

The invention relates to a swept fan blade or compressor blade for a ducted fan gas turbine engine.

In particular the invention concerns the design of fan blades for a high bypass ratio engine of the kind used to power modern civil aircraft. A primary function of the fan is to generate propulsive thrust by adding energy to air passing through a fan duct increasing the pressure and momentum of the air. The performance of such a rotor is judged by the maximum thrust it produces, by way of maximum air flow and pressure rise, and the proportion of the energy input to the fan which is turned into useful thrust, characterised by the fan adiabatic efficiency. Fan stability is an important design consideration and a safety margin between the fan working line and its surge line is allowed to ensure stable operation. Therefore, it is standard practice to design a fan to achieve a given airflow and pressure rise at a chosen rotational speed which is below the maximum attainable to provide this stability margin.

In a high bypass ratio engine the fan is highly loaded and pumps a prodigious quantity of air at maximum speed. To achieve this a typical large engine of current design may have a fan of diameter up to 2 meters or more with individual blades of commensurate size. The fan blades provide thrust in the same way as lift is produced by an aircraft wing except that airspeed increases along the blade leading edge with increasing rotational radius. At some point along the leading edge the relative velocity becomes supersonic and generates a leading edge shock wave. Also as air is entrained in the passages between adjacent blades its pressure increases and at velocities greater than a critical number the pressure disturbances, unable to propagate upstream, produces a passage shock wave.

Shock waves represent a source of energy loss and because the fan produces so much of an engine's thrust any improvement in fan rotor efficiency has a significant effect on engine performance, particularly on fuel consumption.

The present invention has for one of its objectives to increase fan rotor efficiency above the levels currently achieved with existing designs and maintaining or improving the pressure rise with no erosion of the stability margin. It is desired to improve other rotor characteristics, for example resistance to foreign object damage at the same time as bringing about these other improvements.

According to the present invention there is provided a fan stage of a ducted fan gas turbine engine comprising a fan casing having an inner duct wall which in the region of a fan rotor is convergent in the downstream direction, a fan rotor comprising a multiplicity of swept fan blades spaced apart around a hub mounted concentrically with respect to the fan duct, each of said swept fan blades having a tip profile which in revolution conforms to the convergent duct wall, a leading edge of variable sweep angle which varies with increasing blade height or distance from the axis of rotation, said sweep angle having a forward sweep angle in a first height region between a root and a first intermediate radius, a rearward sweep angle in an intermediate height region between the first intermediate radius and a second intermediate radius, a forward sweep angle in a third height region between the second intermediate radius and the blade tip, a stagger angle which increases progressively with blade height.

Preferably the sweep angle of the leading edge is less than the complement of the angle of the Mach cone at any point on the leading edge. Usually sweep is employed to reduce the velocity of the airflow measured perpendicular to the leading edge to subsonic levels. This requires the sweep angle of the leading edge to be greater than the complement of the Mach cone angle. Sweep angle may be defined as the acute angle, at a point on the leading edge of a blade, between a tangent to the leading edge and a line perpendicular to the relative velocity vector measured in a common plane containing the tangent, the velocity vector and the line perpendicular thereto.

Figure 2A:
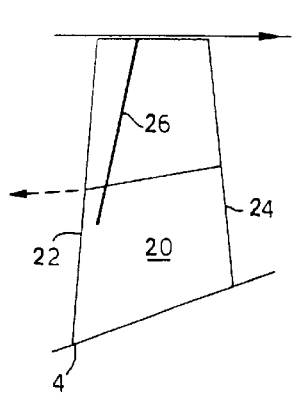
Figure 2B:
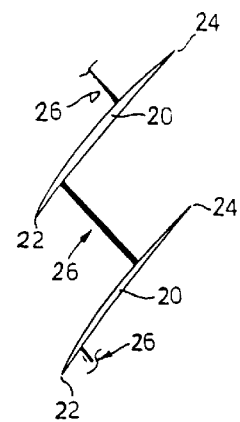
Figure 5A:
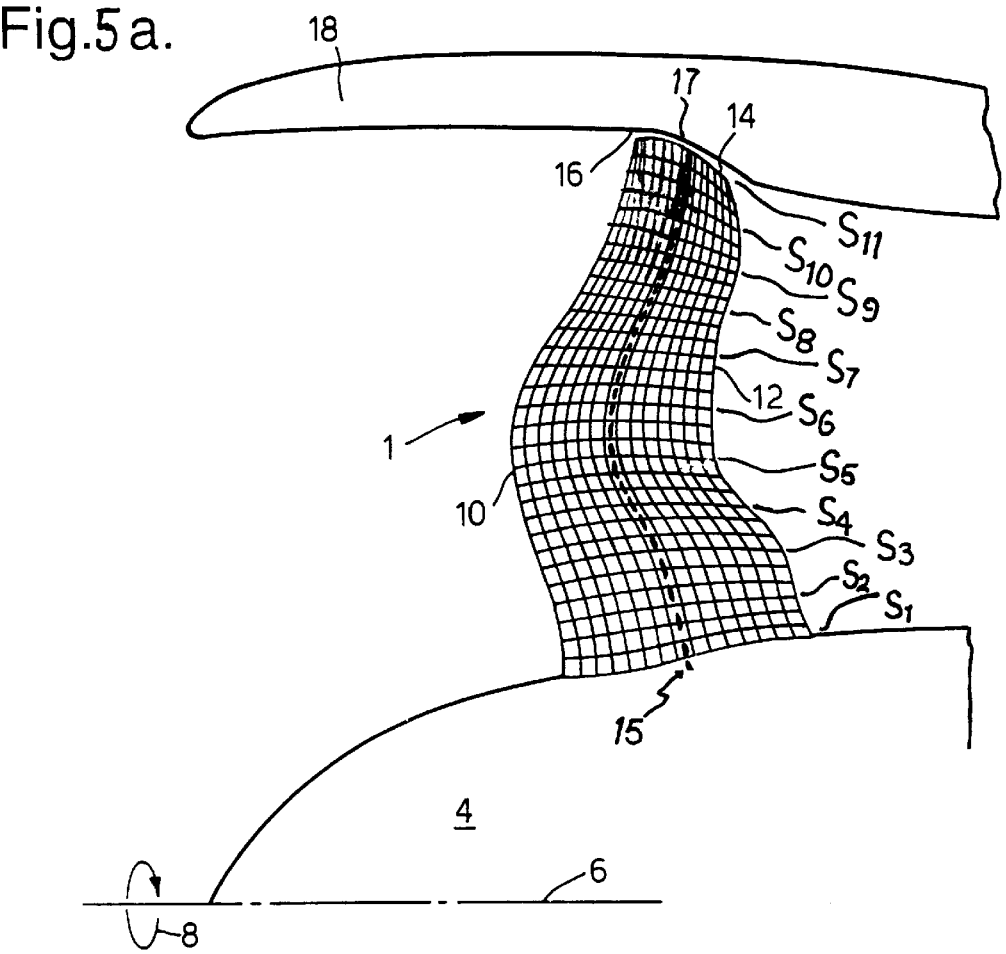
Figure 5B:
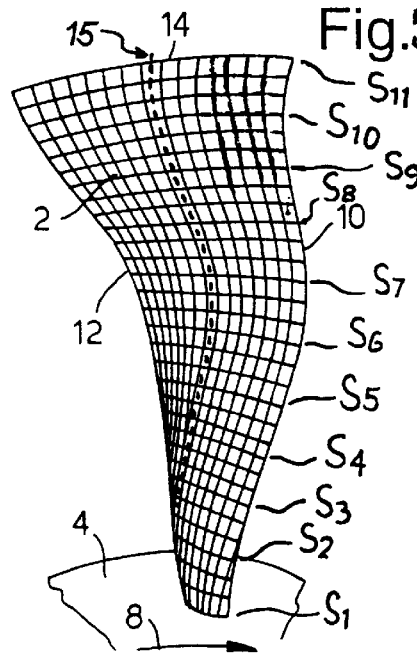
Figure 5C:
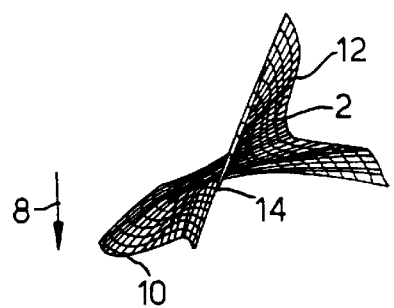
Figure 6:
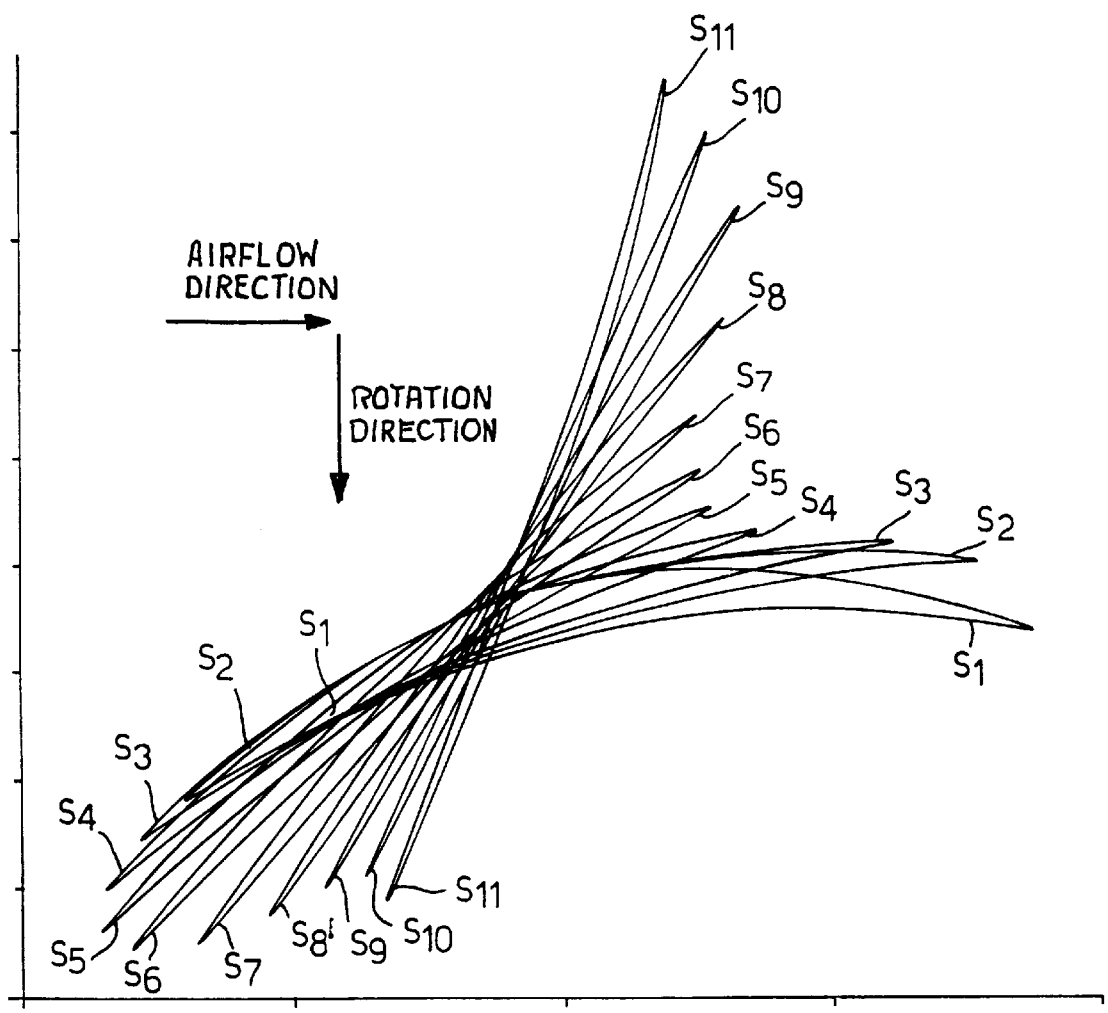
Figure 7A:
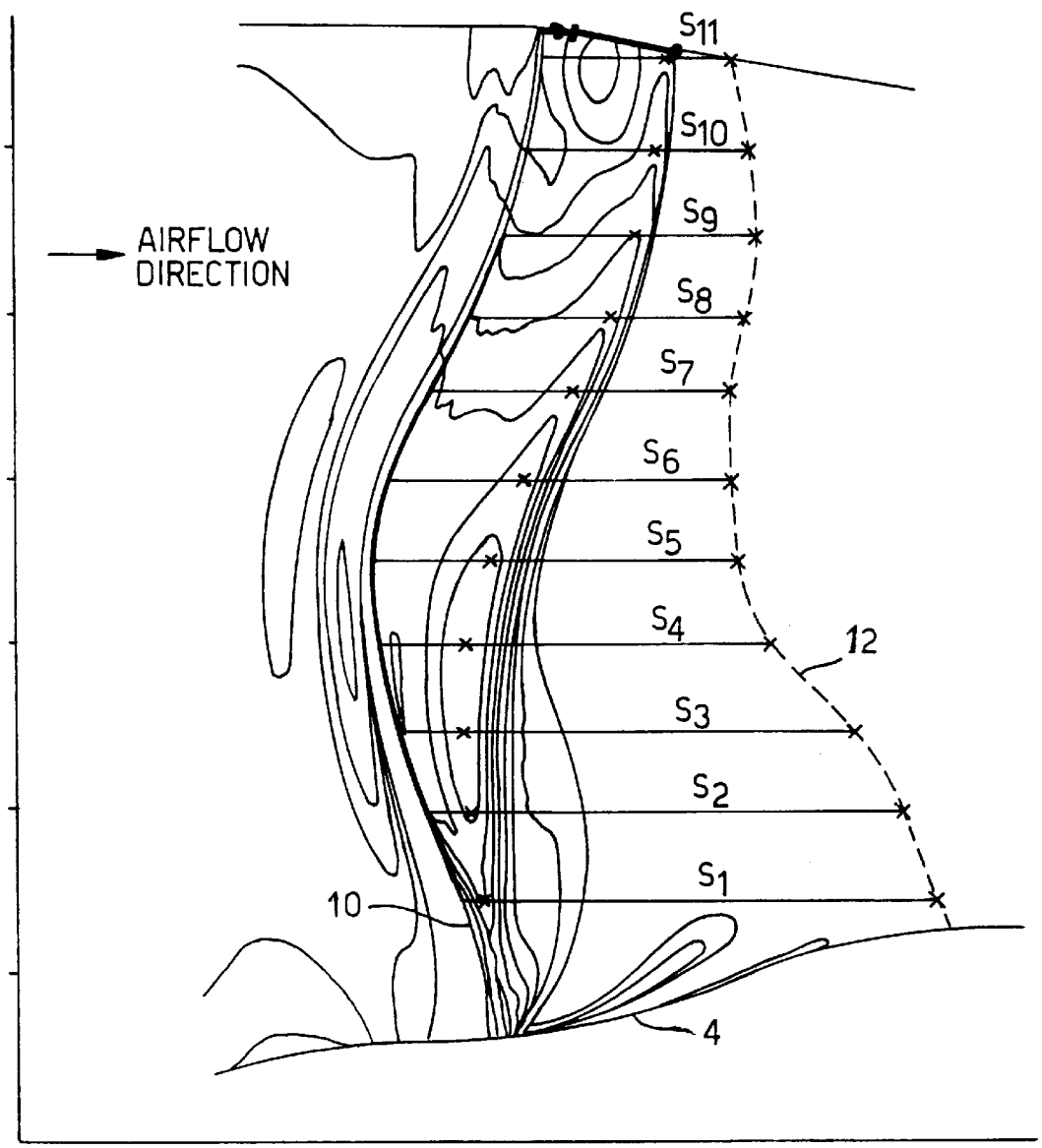
Figure 7B:
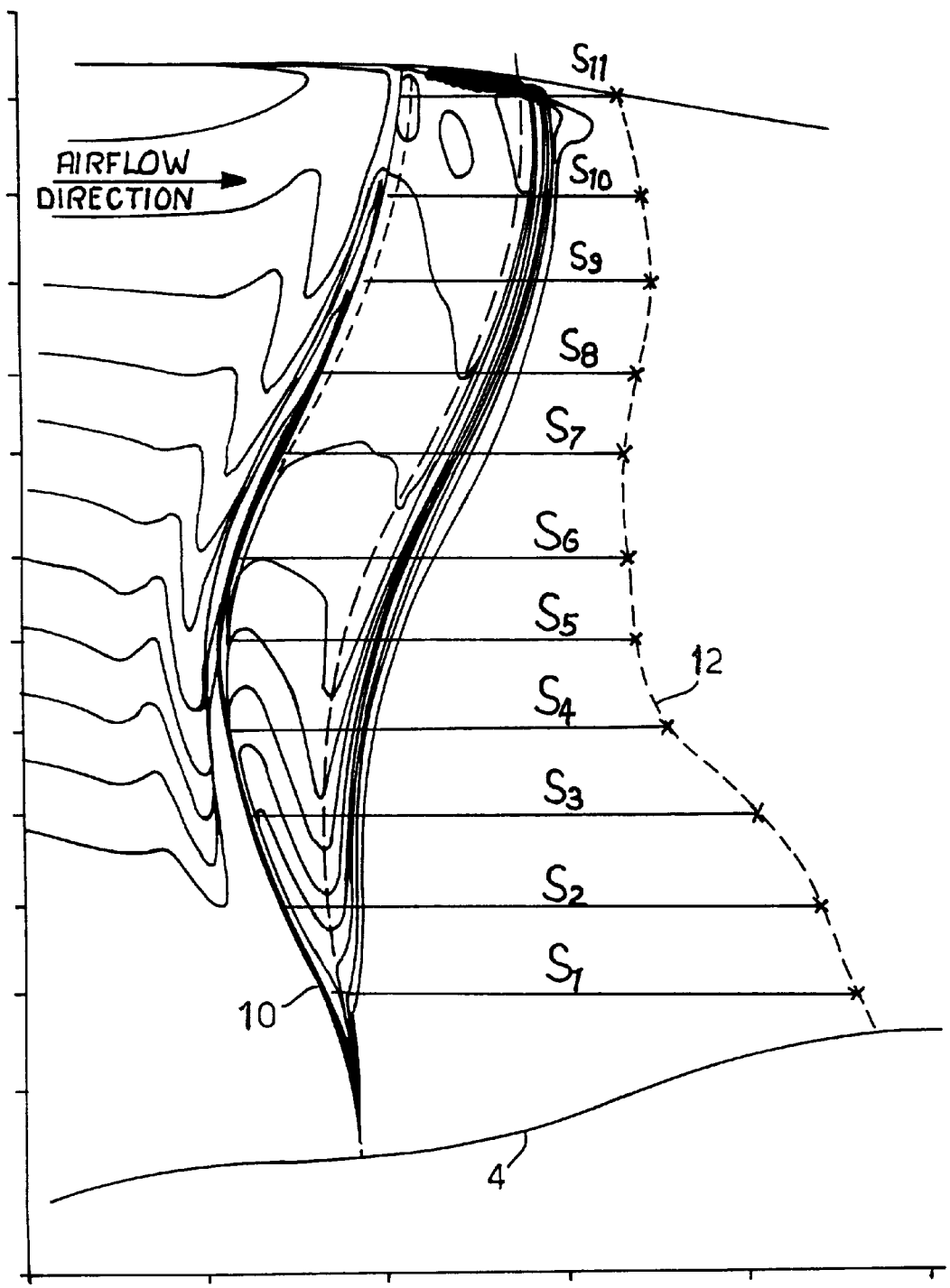

The invention and how it may be carried into practice will now be described in greater detail with reference to a particular embodiment illustrated in the accompanying drawings, in which:

FIG. 1 shows a perspective view of a swept blade fan rotor designed in accordance with the principles of the present invention, FIGS. 2a, 2b; 3a, 3b; and 4a, 4b are side and tip views of a simple unswept blade, a rearward swept blade and a forward swept blade respectively illustrating the effect of sweep on the blade shock waves, FIGS. 5a, 5b and 5c show three orthogonal views of an individual blade from the rotor of FIG. 1, on the surface of which a square grid pattern has been generated to illustrate the contours of the blade, FIG. 6 is a view from a blade tip end of stacked aerofoil segments for a single blade from the rotor of FIG. 1 showing its change of chord length and stagger angle with stacking height, FIGS. 7a and 7b show contour maps of static pressure on a blade suction surface and a corresponding contour map for relative Mach Nos. for the rotor blade of FIG. 1 , and FIG. 8 is a table of sweep angle, Mach angle and Mach No at a number of points of successively greater blade height for the blade design of FIG. 1.

Aerodynamic efficiency of the fan blades and thus of the fan stage, as discussed above, is a major fan attribute affecting engine performance and fuel consumption, but stability is also a major issue that must be addressed in any aerodynamic design. Any design must retain an adequate margin between its working line and the surge line on the pressure ratio against airflow surface. Surge is precipitated when a stall occurs in a compressor or fan cell when a sufficient portion of the passage shock front is expelled. A design objective is thus to have the passage shock front located sufficiently far downstream at the design point to protect the stall margin. Almost inevitably stability and efficiency are counteractive and stability may be bought at the expense of efficiency by over-compromise resulting in lost efficiency while designing for the maximum flow of air leads to instability.

However, blade design is not a straightforward trade-off between the factors affecting stability and efficiency and other variable features and their consequences contribute to the final form of a particular design.

The generation and behaviour of shock waves in rotors made of the basic different types of blade having no sweep, rearward sweep, and forward sweep is illustrated simply in FIGS. 2a,2b; 3a,3b and 4a,4b of the accompanying drawings. To which further reference will now be made by way of summary of the basic aerodynamic effects of the present concern.

FIGS. 2a and 2b show side and tip views of a conventional, unswept rotor blade 20, i.e. a straight edged blade, in these simple diagrams the twist and lean of the blades is omitted for clarity. In this type of design the aerofoil sections over most of the blade height operate in a transonic flow regime, that is, the relative velocity of the air flow with respect to the rotor is supersonic when it passes over the leading edge 22 of the blade but is decelerated often to subsonic speed before passing the trailing edge 24. Much of this deceleration takes place in a step pressure discontinuity or shock front 26 which extends as a two-dimensional surface across a flow channel between adjacent blades, and therefore is bounded on one side by the suction surface of one blade and the pressure surface of an adjacent rotor blade. This discontinuity 26, is known as a passage shock wave.

The passage shock wave adds energy to the air, some of which cannot be recovered as thrust, and this energy loss in the shock wave contributes significantly to the total inefficiency of the fan rotor. Shock wave theory states that these losses are reduced when the Mach number of the airflow immediately ahead of the shock wave, and measured perpendicular to the wave front, is reduced. Therefore rotor efficiency may be increased by leaning the shock wave so that the air flow meets the discontinuity at a more oblique angle. The shock wave lean is achieved by sweeping the leading edge of the blades. Two forms of sweep, forwards and reverse, and the shock fronts produced thereby are illustrated in the side and tip view of FIGS. 3a, 3b and 4a,4b.

Figure 3A:
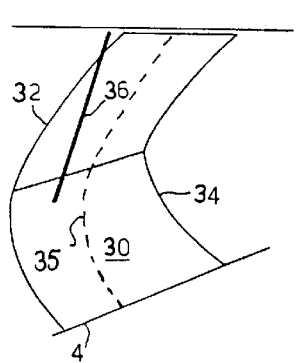
Figure 3B:
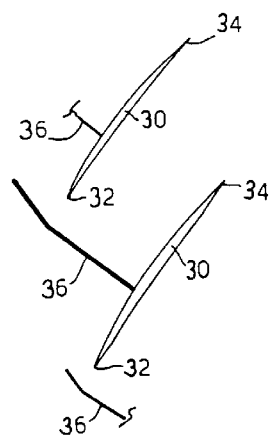

A simple form of rearward swept rotor blade 30 is illustrated by FIGS. 3a and 3b, any twist and lean of a typical practical blade is omitted for clarity and simplicity. In effect the stacked aerofoil segments of a conventional blade, i.e. compared to the blade of FIGS. 2a, are shifted axially rearward to provide a swept leading edge 32 to provide a swept leading edge 32. Forward sweep is employed near the hub 4 to counteract the rearward sweep of the outboard sections of blade 30 in order to make the design mechanically feasible.

The stacking axis, shown by dashed line 35, thus follows a curved path with increasing blade height which in a radial plane curves forward near the hub 4 and then rearwards, effectively tracking the sweep of the leading edge 32. Clearly, therefore centrifugal forces acting at points along the stacking axis 35 produce force couples in the radial plane which generate longitudinal stresses in the blade 30.

Rearward swept blades producing an oblique shock front relative to air stream flow direction generally exhibit good efficiency levels but at the expense of stability as a result of the shock front converging with the blade leading edge at blade heights towards the tip. Blade integrity levels are reasonably good although the rearward curve of the locus of the centres of gravity and pressure again produces high stress levels.

Figure 4A:
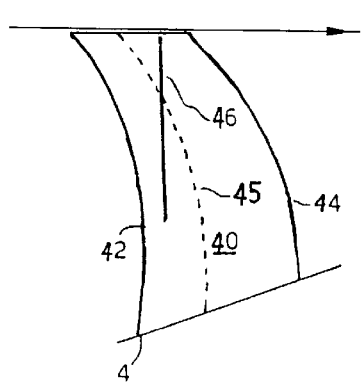
Figure 4B:
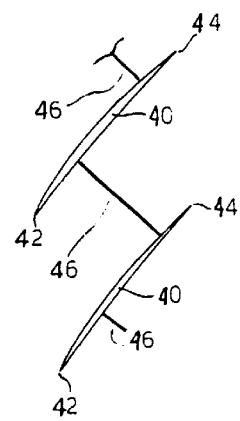

A forward swept blade 40, as illustrated by FIG. 4a and 4b, tends to be very stable because the passage shock front 46 is positioned well back in the throat passage and generally its displacement behind the leading edge 42 increases with blade height. While the forward sweep does not necessarily introduce poor aerodynamic efficiency internal stress levels resulting from the forward curved locus 45 of the centres of gravity and pressure of stacked blade segments are very high. As a result the blades individually have to be stronger and usually thicker, which tends to increase weight and the integrity problems.

Also shown in FIGS. 4a and 4b is the position of the shock surface 46 near to the suction surface. At a given aerofoil segment at a specific distance from the engine centre line (radial height) the position of the shock wave 46 is a function not only of the shape and position of this segment, but also of the position of the shock wave on other segments i.e. at different radial heights. This means that when a swept blade is designed as described above, the two-dimensional surface of shock wave 46 tends to shift less than the shift of the aerofoil segments, i.e. the sweep of the shock surface is less than the sweep of the leading edge 42. This results in the shock wave being closer to or even in front of the leading edge 42 near the suction surface towards the tip of the blade, as shown in FIGS. 4a and 4b.

Surge margin or stability is another design criterion to be considered. At the normal operating pressure rise and air flow rate the rotor must have sufficient safety margin to avoid flutter or surge. This margin is eroded when the operating pressure rise is increased. In such circumstances the shock wave is caused to move forwards towards the leading edge of the rotor blades. Eventually a limiting point is reached when the rotor can no longer maintain stable operation and the rotor will either suffer a violent reversal of airflow, known as a surge, or heavy vibration caused by local oscillations in airflow, known as flutter.

The present invention, however, overcomes these inherent stability problems of sweep by employing a number of specific novel physical features to move a shock surface rearwards, away from the leading edge, at the blade tip.

Mechanical loads and distribution caused by the high centrifugal forces produced by high speed rotor rotations have to be taken into account also, and can affect the integrity of blade designs. Since the relative velocity between blade and air stream increases with blade height, as well as the rotational speed, the aerodynamic design changes according to the conditions at the design point and this appears as, in particular, increasing blade twist in addition to blade sweep. Taken together, therefore, any blade design possesses a characteristic twist or stagger which varies with blade height; and a lean in which notional blade chordal sections are relatively displaced with blade height to provide forward or rearward sweep, as well possibly as circumferential lean. Thus, the locus of the centres of gravity of successive chordal cross-sections at increasing blade height normally deviates significantly from a radial path and as a result high internal stress levels can be generated. In order to contain these stresses blade thickness may have to be increased, adding mass and tending to exacerbate the problems and possibly detracting from the aerodynamic efficiency of the design.

Tolerance to foreign object damage and in particular bird strike, is another important design consideration. Resulting damage is caused by the magnitude of impact energy and the amount imparted to the blade which is measured in a direction normal to the blade surface.

A preferred embodiment of the present invention will now be described with reference to the accompanying drawings. Referring to the perspective view of a fan rotor in FIG. 1 although this is a view of a fan rotor incorporating swept blades in accordance with the present invention. There is shown a circular array of identical fan blades, of which one is referenced at 2, equidistantly spaced apart around the periphery of a rotatable hub 4. The manner by which the blades 2 are mounted on the hub 4 has no significance in the present context, it is irrelevant whether the blades are demountable or permanently fixed to the hub or disc 4, or formed integrally therewith.

No general limitation is intended by, nor should be inferred from, this description of an exemplary embodiment. Similarly, the composition and construction of the blades 2 is outside the scope of this invention, that is whether the blades are solid or hollow, metal or composite, or monolithic or fabricated.

The hub 4 is rotatable about an axis 6 in the direction of arrow 8, and this direction of rotation defines for each blade 2, its leading edge 10 and trailing edge 12, and the pressure and suction surfaces 16,18 respectively. The blades are shroudless and each therefore has a plain, unshrouded tip 14. The stacking axis of the blade is generally indicated by the broken line 15. Thus the overall appearance of a fan rotor incorporating blades designed according to the present invention is illustrated in the perspective view of FIG. 1.

FIGS. 5a, 5b and 5c show three mutually orthogonal views of one of the blades in which a rectangular grid has been superimposed on the surfaces of the blade in order to highlight its surface contours. Particularly noticeable are the two changes of sign of the sweep angle of the leading edge; the way in which the trailing edge and the stacking axis 15 of the blade follow the variations and sign changes of the leading edge; and the increasing twist of the blade with increasing radial height.

FIG. 6 shows a view of the blade on a radial axis of eleven blade segment profiles references $S_1$–$S_{11}$ taken at equidistantly spaced radial heights from blade root to tip which are superimposed or stacked one on another to illustrate the sweep, lean and twist of the blade at successively greater radial heights.

Referring to FIGS. 5a, 5b, 5c and FIG. 6 the rotor blade leading edge 10 from the root radially outwards with increasing radial height is swept forward from the hub 4 or root segment $S_1$ (FIG. 6) to a maximum forward segment $S_5$ at approximately mid-height from where the leading edge is swept rearwards through segments $S_6$ to $S_{10}$. At about 75% of radial height the increasing rearward sweep is begun to be blended out until at around segment $S_{10}$ there is a change of sign in the inclination of the leading edge 10. Near the blade tip 14 the inclination of the leading edge changes to forward sweep in the segment $S_{11}$. Also between segments $S_{10}$ and $S_{11}$ the chord length of the aerofoil section is increased. The axial and lateral disposition, i.e. stacking, of the blade aerofoil segments indicated by the movement of the stacking axis 15 in FIG. 5 is also apparent from FIG. 6 although the axis has been omitted for clarity. The blade tip segment $S_{11}$ is positioned forward of the blade hub segment $S_1$, such that the point halfway between the leading edge and the trailing edge of the tip segment is axially upstream of a corresponding point of the hub segment. It will be apparent that, although there is considerable movement of the leading and trailing edges, there is relatively little axial and lateral (circumferential) movement of the blade segment stacking axis over its radial height. The internal stress levels arising from centrifugal forces due to rotation are dependent upon the separation distance between the stacking axis 15 and a true radius about the rotors axis of rotation. Thus, the more nearly radial is the stacking axis the lower are the stress levels generated by rotation.

The stagger angle, or twist, of the blade segments and how it increases with radial height between segments also will be apparent from FIG. 6. In comparison with a known, conventional fan rotor of similar dimensions the stagger angle of the mid height segments (roughly from $S_7$ to $S_8$) is reduced and the stagger of the tip segments (from $S_8$ to $S_{11}$) increased. In the particular blade illustrated the stagger of the mid-height section is in the range approximately 30° to approximately 55° relative to the airflow direction, while the stagger of the tip region increases from the approximately 55° angle to almost 70° also relative to the airflow direction at the tip. This feature produces a distinct mid-height bias to the airflow distribution across the span of a blade, with the result that airflow through the mid-height regions of the flow passage is increased and the airflow through the tip regions is reduced. This has an advantageous effect on the overall efficiency of the blade. This distinctive airflow distribution is contained within a region relatively close to the front and rear faces of the rotor, that is within approximately one chord length upstream of the leading edge and a similar distance downstream of the trailing edge. The airflow in this region is deflected away from both the hub and the tip, and follows a curved trajectory towards the mid-height passage region. As a result airspeed of the air stream in these regions especially in the tip region close to the fan casing wall is reduced. This allows the stagger angle of the radially outermost aerofoil segments of the blade (roughly segments $S_9$ to $S_{11}$) to be increased, that is blade twist is significantly increased and the stacking axis is inclined forwards.

The inner surface of the annular fan casing in the region 17 immediately encircling the fan rotor is tapered in the downstream direction, that is the diameter of the region 17 is greater on the upstream side of the fan 1 compared to the downstream side. Generally it has the appearance of a short frusto-conical surface although to avoid aerodynamic turbulence abrupt contour changes are avoided and blended smoothly with the remaining inner surface of the casing. An angled casing of this kind has long been used by us to avoid complicated aerodynamic interference effects which might otherwise be brought about by reflection of the passage shock waves from the casing wall as has been described in U.S. Pat. No. 5,642,985. In the present invention the potential effect of reflected passage shock waves is lessened by the reduction of airspeed in the blade tip regions which naturally produces weaker shock waves. Thus, any proclivity to generation of a reflected endwall shock is further reduced by the effect of the blade design.

A further advantage accruing from the invention due to the increased twist of the tip region is its improved resistance to foreign object damage (FOD). As previously mentioned, in an FOD strike the energy imparted to, or absorbed by, is determined by the magnitude of the component of the relative velocity vector resolved in a direction perpendicular to the blade edge or blade surface at the point of impact. This component of the relative velocity vector is obtained resolving the result of a vector addition of the speed of the object in the direction of travel with the blade speed in the direction of rotation. It will be apparent upon consideration that the magnitude of this resolved component is reduced by a greater blade twist angle. The blade thickness is thus able to be reduced lowering the mass of the section of the blade. Consequently the centrifugal forces acting on the blade outer region are reduced so the internal stress suffered by the blade is reduced. However, it is not a straightforward matter of simply introducing more blade twist because of the effect on blade aerodynamic efficiency. Too much twist would just reduce the efficiency of the blade to a point where it became too inefficient for practical use, and would cause stability to collapse over a substantial proportion of the blade height. An important factor in the success of the present blade design is the mid-height bias to the airflow distribution which facilitates the reduction of the speed of the airflow at high blade radii thereby permitting the increase of blade twist and the reversal of leading edge sweep angle, characteristics which give the blade design a distinctive appearance. Thus, a radially outer region of the blade including the tip region is particularly distinctive, most noticably it has a forward sweep angle, increased blade twist and forward lean of the stacking axis. Because of the smooth blended nature of the changes it is not possible to precisely define the inner radial limit of this region, although approximately it accounts for about 15% but may be up to about 20% of the radially outermost portion of the blade. In this blade tip region the sweep of the leading edge changes from rearward sweep to forward sweep. Furthermore, as a result of some of the improvements the blade tip region is less susceptible to foreign object damage, as explained below. Consequently, the blade tip region may be reduced in thickness. So it is a further characteristic of the blade's appearance that the tip region, when compared with a known blade designed for similar engine size and mass flow, is significantly thinner.

Because of the correlation between blade speed (i.e. linear speed as opposed to rotational speed) and radial distance from the axis of rotation impact energy also tends to increase with blade height. Thus, the greater angle of twist and any reduction of relative speed between an object and a blade that can be achieved serves to lessen impact energy and the severity of consequential damage. At blade heights towards the tip where relative speed is maximium the amount of energy transferred to a blade by impact with a foreign object in a direction normal to the blade surface is reduced by the increased angle of blade twist.

Further to the features described above the stability of the swept blade is maintained by employing only modest amounts of sweep, when compared to previous designs, which tend to set the sweep angle to be greater than the complement of the Mach cone angle at a given position on the aerofoil segment, usually the leading edges although other additional positions, e.g. minimum suction surface static pressure points, have been stipulated.

As mentioned above, in operation, each blade creates a shock wave front which at design speed is a predetermined distance behind the leading edge. Also on the suction surface of the blade the segment profiles combine to create a spanwise extending line of minimum static pressure points. FIG. 7a shows a plot of static pressure contours (isobars) on the suction surface of a fan blade according to the invention, and in the airflow regions immediately upstream of the leading edge 10 and downstream of the trailing edge 12. The eleven segment profiles of FIG. 6 are indicated by horizontal lines $S_1$–$S_{11}$, that is the lines so referenced which are parallel to the airflow direction indicated by an arrow. Apparent are pressure gradients in the axial or airflow direction which reveal the spanwise distribution of the line of minimum static pressure points, in front of the shock wave on the blade surface marking the abrupt transition between subsonic and supersonic flow. The distribution of isobars also reveals the mid-height bias in the airflow over the blade surface and the tip region reduction.

FIG. 7b shows corresponding contours of relative Mach number for airflow over the blade suction surface. These clearly show the abrupt transitions at the blade leading edge and at the blade surface where the passage shock wave meets the surface. On the left hand, vertical axis the plane section numbers $S_1$–$S_{11}$ are inscribed for easy cross-reference between drawings. The leading edge 10 of the blades is inscribed for ease of reference and by comparison of the position of the step in the pressure contours the relative location of the shock front on the blade surface can be observed. Again the reduction of airflow in the tip region adjacent the casing wall can also be discerned.

FIG. 8 contains a table showing sweep Angle, Mach angle, i.e. the angle of the Mach cone, and Mach No for both the line of minimum static pressure points and at the blade section profile segment $S_1$–$S_{11}$. The changes of the leading edge sweep angle will immediately apparent from the column headed "SWEEP ANGLE".

The swept blade design described above is presented as an exemplary embodiment of the invention. It will be appreciated that the described design is not the only swept blade design which may embody the invention defined in the following claims.

What is claimed is:

1. A fan stage of a ducted fan gas turbine engine, comprising
    a fan casing having an inner duct wall which in a fan rotor region is convergent in the downstream direction; and
    a fan rotor including a multiplicity of swept fan blades spaced apart around a hub mounted concentrically with respect to the fan duct, each of said swept fan blades having a tip profile which in revolution is convergent so as to substantially correspond to the convergent duct wall, a leading edge of variable sweep angle which varies with increasing blade height or distance from the axis of rotation, said sweep angle having a forward sweep angle in a first height region between the root and a first intermediate radius, a rearward sweep angle in an intermediate height region between the first intermediate radius and a second intermediate radius, a forward sweep angle in a third height region between the second intermediate radius and the tip of the blade, a stagger angle which increases progressively with blade height.

2. A fan stage of a ducted fan gas turbine engine as claimed in claim 1 wherein the blade has a tip region of up to about 20% of blade height characterised in that the stagger angle increases to approximately 70° at the tip relative to the airflow direction.

3. A fan stage of a ducted fan gas turbine engine as claimed in claim 2 wherein a blade tip region of up to about 20% of the height of the blade the sweep of the leading edge changes from rearward sweep to forward sweep.

4. A fan stage of a ducted fan gas turbine engine as claimed in claim 3 wherein the blade is further characterised in that the stagger angle of the mid-height region of the blade is in the range from approximately 30° to approximately 55° relative to the airflow direction.

5. A fan stage of a ducted fan gas turbine engine as claimed in claim 1 wherein the sweep angle of the leading edge of a swept fan blade at a point on the leading edge is less than the complement of the angle of a Mach cone at any other point on the leading edge of the blade at greater radius from the root.

6. A fan stage of a ducted fan gas turbine engine as claimed in claim 1 wherein the shape of the pressure surface of a swept fan blade and the suction surface thereof creates, in use, a line of minimum static pressure points on the suction surface of the blade, said line of minimum static pressure points is inclined with respect to the axial direction at a sweep angle which varies with span height of the blade, and has a negative value in a region of subsonic flow over the leading edge.

7. A fan stage of a ducted fan gas turbine engine as claimed in claim 6 wherein the sweep angle of the line of minimum pressure points at a point on the line is less than the complement of the angle of a Mach cone at any other point on the line.

8. A fan stage of a ducted fan gas turbine engine that is at least in part rotatable about an axis of rotation and defines a downstream direction along the axis of rotation, comprising:
    a fan casing that defines an inner duct wall having a fan rotor region, the inner duct wall of the fan casing at the fan rotor region being convergent;
    a hub disposed concentrically relative to the fan casing;
    a fan rotor that includes multiple swept fan blades, the swept fan blades being spaced apart around the hub, each of the multiple swept fan blades having:

a tip profile that is convergent so as to substantially correspond to the convergent inner duct wall of the fan casing;

a leading edge that defines a variable sweep angle in a direction perpendicular to the axis of rotation, the leading edge including:

an inner region adjacent the hub, the inner region defining a forward sweep angle;

an intermediate region between the inner region and the fan casing, the intermediate region defining a rearward sweep angle; and an outer region between the intermediate region and the fan casing, the outer region defining a forward sweep angle.

9. The fan stage according to claim 8, wherein the intermediate region extends further than the inner region along the axis of rotation.

10. The fan stage according to claim 8, wherein the inner duct wall of the fan casing at the fan rotor region is substantially convergent in the downstream direction.

11. The fan stage according to claim 8, wherein the tip profile of the multiple swept fan blades are substantially convergent in the downstream direction.

12. The fan stage according to claim 8, wherein the inner duct wall of the fan casing at the fan region is not parallel to the tip profile of each of the multiple swept fan blades.

13. The fan stage according to claim 8, wherein each of the multiple swept fan blades includes a hub contacting surface that extends further than the tip profile along the axis of rotation.

* * * * *